United States Patent
Bibby et al.

(10) Patent No.: US 7,505,400 B2
(45) Date of Patent: Mar. 17, 2009

(54) DUAL LANE CONNECTION TO DUAL REDUNDANT AVIONICS NETWORKS

(75) Inventors: Dave Bibby, Scottsdale, AZ (US); Nicholas Wilt, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 896 days.

(21) Appl. No.: 10/948,267

(22) Filed: Sep. 22, 2004

(65) Prior Publication Data

US 2006/0062143 A1    Mar. 23, 2006

(51) Int. Cl.
*H04L 12/26* (2006.01)
(52) U.S. Cl. .................................. 370/217
(58) Field of Classification Search ............. None
See application file for complete search history.

(56) References Cited

U.S. PATENT DOCUMENTS

| | | | |
|---|---|---|---|
| 5,513,527 A | 5/1996 | Griffiths | |
| 6,289,024 B1 | 9/2001 | Toillon | |
| 6,467,003 B1 * | 10/2002 | Doerenberg et al. | 710/117 |
| 6,664,656 B2 * | 12/2003 | Bernier | 701/3 |
| 7,103,456 B2 * | 9/2006 | Bloch et al. | 701/3 |
| 7,242,683 B2 * | 7/2007 | Saint Etienne et al. | 370/389 |
| 7,346,052 B2 * | 3/2008 | Saint Etienne et al. | 370/389 |
| 7,352,744 B2 * | 4/2008 | Saint Etienne et al. | 370/389 |
| 7,356,028 B2 * | 4/2008 | Saint Etienne et al. | 370/389 |
| 7,362,755 B2 * | 4/2008 | Saint Etienne et al. | 370/389 |
| 2002/0116646 A1 | 8/2002 | Saint Elienne | |
| 2003/0147377 A1 | 8/2003 | Saint Elienne et al. | |
| 2003/0147477 A1 | 8/2003 | Kawai | |
| 2003/0149788 A1 | 8/2003 | Saint Elienne et al. | |
| 2003/0162077 A1 | 8/2003 | Saint Elienne et al. | |
| 2004/0078123 A1 * | 4/2004 | Igloi et al. | 701/29 |
| 2004/0180653 A1 * | 9/2004 | Royalty | 455/431 |
| 2005/0065669 A1 * | 3/2005 | Roux et al. | 701/3 |
| 2006/0010438 A1 * | 1/2006 | Brady et al. | 717/174 |

OTHER PUBLICATIONS

PCT International Search Report PCT/US2005/033939 Feb. 3, 2006.
M. Sanchez-Puebla, J. Carretero: A New Appproach For Distributed Computing In Avoinics Systems; XP-002307664; pp. 579-584.

* cited by examiner

*Primary Examiner*—Anh-Vu H Ly
(74) *Attorney, Agent, or Firm*—Fogg & Powers LLC

(57) ABSTRACT

Apparatus and systems are provided for dual redundant avionics networks wherein a remote data concentrator (RDC) includes, but is not limited to, a line replaceable unit (LRU) input, a first processing lane coupled to the LRU input, a second processing lane coupled to the LRU input, and a processor coupled to the first processing lane and the second processing lane. The first processing lane has a first output. The second processing lane has a second output. The processor has a link coupling the first processing lane with the second processing lane and is configured to route data from at least one of the first output and the second output to an Ethernet. The link is configured to transfer data between the first processing lane and the second processing lane.

19 Claims, 3 Drawing Sheets

US 7,505,400 B2

DUAL LANE CONNECTION TO DUAL REDUNDANT AVIONICS NETWORKS

FIELD OF THE INVENTION

The present invention generally relates to avionics networks, and more particularly relates to redundant avionics networks.

BACKGROUND OF THE INVENTION

Ethernet type networks have been used in communication networks for implementing communication among various network components. An Ethernet network may be used to send or route data in a digital form by packets or frames. Each packet contains a set of data, and the packet is generally not interpreted while sent through the Ethernet network. The Ethernet network is typically composed of different equipment that subscribes to the network and connects to each other through switches. Each network subscriber can send packets in digital form generally at any time to one or more other subscribers. When a switch receives the packets, the destination equipment is determined, and the packets are switched to such equipment. In a switched full-duplex Ethernet type network, the term "full-duplex" refers to sending and receiving packets at a same time on a same link, and the term "switched" refers to the packets being switched in switches on appropriate outputs.

Avionic systems generally include numerous components that may exchange data among one or more other components. For example, a variety of external sensors may gather information that is routed via an avionics network to a number of different aircraft components. In avionic systems, redundant networks are common design considerations. More recently, Ethernet networks have been used in avionic network environments. For example, Aeronautical Radio Inc. (ARINC) 664 Part 7 regarding avionics full duplex switch Ethernet networks, or more commonly referred to as AFDX, sets forth an aeronautical standard that defines a dual redundant avionics network for use in an aircraft environment.

In an aircraft environment, any number of different line replaceable units (LRUs) may be connected to an avionic network. One method of connecting an LRU to a network is with an end system interface typically having two full-duplex Ethernet connections. The LRU transmits and receives messages on either an "A" network, a "B" network, or both networks. Messages sent on both networks, such as an original message and a redundant copy of the original message, are typically selected at the destination end system using "First Arrival Wins," and the redundant copy may be discarded.

When connecting a dual lane LRU (e.g., an LRU having redundant processing lanes) to an AFDX network, a common method is to have an end system for each lane (e.g., a total of 4 full duplex Ethernet connections for a single dual lane LRU). This design generally creates a significant number of connections to the AFDX network that results in an equally significant cost for each port and wiring that is associated with each connection.

Accordingly, it is desirable to provide a dual redundant avionics network having a minimized number of connections for each end system. It is also desirable to provide a dual lane remote data concentrator (RDC) end system having dual RDC processing lanes while minimizing a number of switch ports connecting the RDC to the avionics network. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus and system are provided for dual redundant avionics networks. In a first exemplary embodiment, a remote data concentrator (RDC) includes, but is not limited to, a line replaceable unit (LRU) input, a first processing lane coupled to the LRU input, a second processing lane coupled to the LRU input, and a processor coupled to the first processing lane and the second processing lane. The first processing lane has a first output. The second processing lane has a second output. The processor has a link coupling the first processing lane with the second processing lane and is configured to route data from at least one of the first output and the second output to an Ethernet. The link is configured to transfer data between the first processing lane and the second processing lane.

In a second exemplary embodiment, a dual redundant avionics network includes, but is not limited to, a first system data network (SDN) having a first SDN port, a second SDN having a second SDN port, and a remote data concentrator (RDC) end system configured to communicate with the first SDN and the second SDN. The RDC end system has a first processing lane coupled to the first SDN port, a second processing lane coupled to the second SDN port, and a processor coupled to the first processing lane and the second processing lane. The first processing lane has a first line replaceable unit (LRU) input. The second processing lane has a second LRU input. The processor has a link coupling the first processing lane with the second processing lane. The link is configured to transfer data between the first processing lane and the second processing lane.

In a third exemplary embodiment, an RDC end system in an Ethernet network includes, but is not limited to, a first port configured to couple to a first network in the Ethernet network, a second port configured to couple to a second network in the Ethernet network, a first processing lane coupled to the first port, a second processing lane coupled to the second port, and a cross-lane bus coupled to the first processing unit and the second processing unit. The first processing lane has a first input configured to receive input signals, a first output configured to transmit output signals, and a first processing unit coupled to the first input and the first output. The first processing unit is configured to control data flow to the first output, to the first port, and from the first input. The second processing lane has a second input configured to receive input signals, a second output configured to transmit output signals, and a second processing unit coupling the second input with the second output. The second processing unit is configured to control data flow to the second output, to the second port, and from the second input. The cross-lane bus is configured to transfer data between the first processing lane and the second processing lane.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
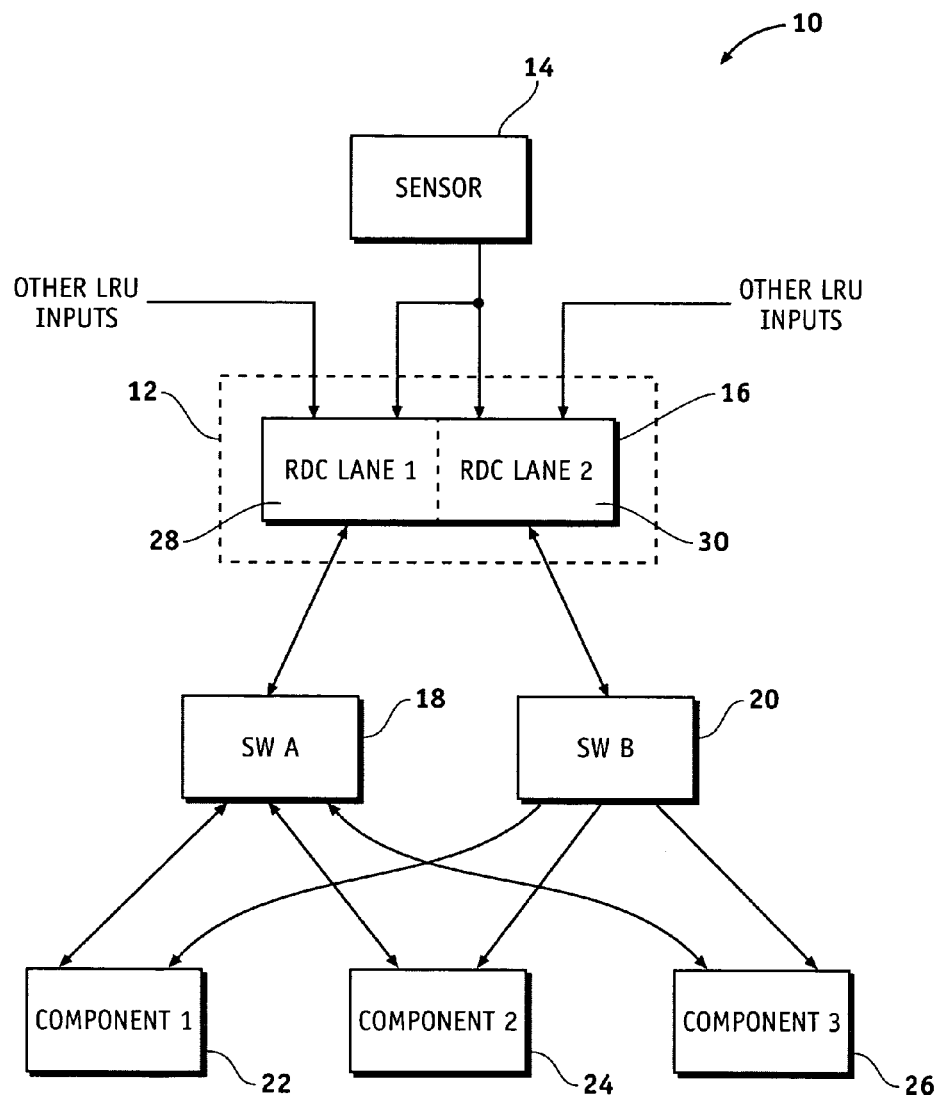
FIG. 1 is a schematic diagram illustrating an exemplary embodiment of a remote data concentrator (RDC) end system.

Referring to the drawings, FIG. 1 is a schematic diagram illustrating an exemplary embodiment of an avionics network 10 having a dual lane remote data concentrator (RDC) end system 12. The avionics network 10 is an Ethernet type network where one or more line replaceable units (LRUs), such as a sensor 14, are coupled to a dual lane RDC 16. The RDC end system 12 is coupled to a system data network (SDN) A and an SDN B via an "A" switch 18 and a "B" switch 20. Each of the switches 18, 20 is further coupled to various network components 22, 24, 26, such as processors, avionic instruments, and the like. Although not shown in FIG. 1, additionally switches, and RDCs, and the like, may also be coupled to the switches 18, 20. In a full-duplex Ethernet network environment, each of the switches 18, 20 is coupled to the same network component. In this exemplary embodiment, the RDC end system 12 includes, but is not limited to, sensor interface circuitry that is incorporated with the RDC 16. Alternatively, the sensor interface circuitry may be separate from the RDC 16.

An LRU can be any of a variety of devices used in an avionics network environment, such as a sensor, a switch, an avionic instrument, etc. The LRU typically has two full duplex Ethernet connections for each processing lane associated therewith. One example of an LRU is a proximity sensor that may be coupled with the RDC 16. A proximity sensing interface may be separate from an RDC 16 or incorporated into the RDC 16 to take advantage of an existing enclosure, a power supply, and a bus interface circuitry that are commonly associated with the RDC 16. Additionally, proximity sensing interfaces may include signal conditioning circuitry and digital signal processors that may both be incorporated into the RDC 16 and provided with a separate data conversion hardware.

In one exemplary embodiment, the proximity sensor interface has electronics that provide excitation to and receives inputs from a two-wire variable reluctance proximity sensor and uses these inputs to detect mechanical position and/or displacement. Each proximity sensor is sequentially multiplexed into inputs of an impedance analyzer. A precision frequency sine wave generated by the digital signal processor provides excitation required for impedance measurements. A sensor return signal is anti-alias filtered, sampled synchronously with the excitation waveform, windowed, and processed by a Fast Fourier Transform (FFT) algorithm. The resulting sensor total impedance and resistance are used to determine inductance which is proportional to sensor-target distance.

The RDC 16 has two independent processing lanes 28, 30. Each of the processing lanes 28, 30 is substantially identical with the other processing lane. The dual lane RDC end system 12 provides for dual redundant RDC processing lanes without increasing the number of system data network (SDN) switch ports that are generally required to connect an RDC to the network. Each lane 28, 30 of the RDC end system 12 is coupled to a separate SDN network (e.g. A or B), and each lane 28, 30 processes redundant messages (e.g., A RDC messages and B RDC messages).

In one exemplary embodiment, the RDC end system 12 has Virtual Links from the RDC 16 and uses an End System Virtual Link Redundancy Management function to select between the redundant A and B RDC messages. The term "Virtual Link" is referred herein as a connection having a fixed single transfer direction between a single source equipment and one or more destination equipment and having a fixed passband (e.g., maximum number of packets and packet size per second transfer). A network subscriber may have several Virtual Links. A switch may use a static configuration table to determine the Virtual Links associated therewith and an allowable number of packets for a Virtual Link.

To enable ARINC 664 Part 7 Redundancy Management to manage RDC Virtual Link outputs on the network, the two RDC lanes 28, 30 operate synchronously and process universal data protocol (UDP) messages in parallel. For RDC inputs that are only available in one lane of the RDC 16, these parameters are transferred to the other RDC lane on a cross lane bus, described in greater detail hereinbelow, such that both lanes 28, 30 of the RDC 16 preferably contain substantially the same information in each UDP message. The RDC lane also synchronizes a Virtual Link sequence number for each UDP message transmitted between the A and B network such that the End System Redundancy Management can select between the two RDC lane outputs. In the event of a failure of one lane of the RDC 14 in one exemplary embodiment, the other RDC lane continues to transmit all parameters that are available on a local lane and sets any parameters that are only available from the failed lane as invalid.

Figure 2:
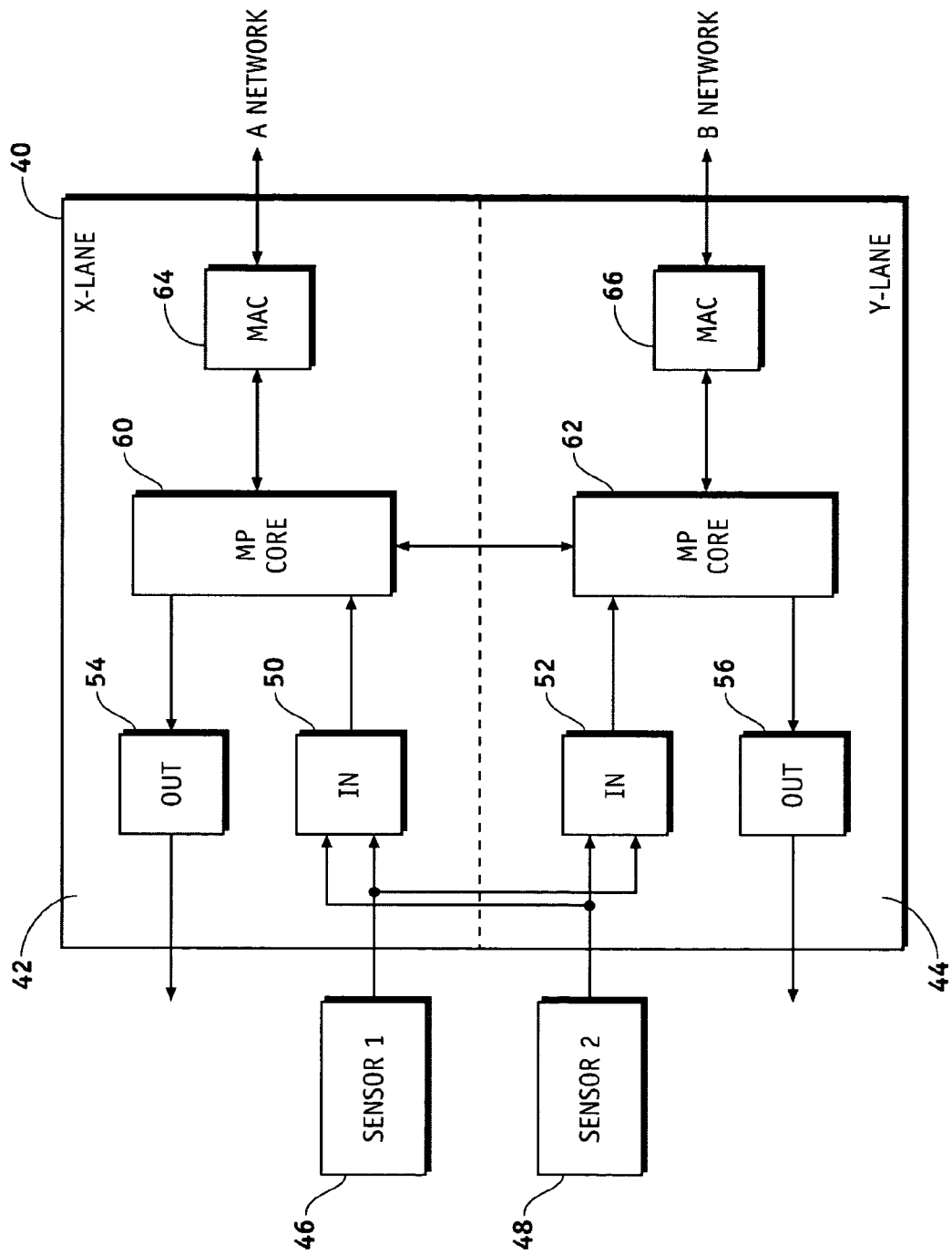
FIG. 2 is a schematic diagram illustrating an exemplary embodiment of a dual lane RDC.

FIG. 2 is a schematic diagram illustrating an exemplary embodiment of a dual lane RDC 40. The RDC has an "X" lane 42 that processes UDP messages to the "A" network, such as coupled via the "A" switch 18 shown in FIG. 1, and a "Y" lane 44 that processes UDP messages to the "B" network, such as coupled via the "B" switch 20 shown in FIG. 1. The "X" lane 42 and "Y" lane 44 each have a microprocessor core 60, 62, respectively. In an exemplary embodiment, separate microprocessors may be used where each microprocessor contains one of the microprocessor cores 60, 62. Each of the microprocessor cores 60, 62 has an input unit 50, 52, respectively, and an output unit 54, 56, respectively. The input units 50, 52 and output units 54, 56 may contain various signal conditioning circuitry or the like.

One or more LRUs 46, 48 may be coupled to the RDC 40. In this exemplary embodiment, Sensor 1 46 and Sensor 2 48 are each respectively coupled to both of the input units 50, 52 of the RDC 40 such that each LRU 46, 48 input is associated with each RDC lane 42, 44. A link 68 connects the microprocessor core 60 of the "X" lane 42 with the microprocessor core 62 of the "Y" lane 44 to transfer information between the lanes 42, 44. The link 68 may be a cross lane bus that transfers parameters associated with inputs that are only available in one lane of the RDC 40 to the other RDC lane.

A media access control (MAC) module 64, 66 may be coupled to each microprocessor core 60, 62 corresponding to one of the RDC lanes 42, 44. The MAC modules 64, 66 perform frame data encapsulation/decapsulation, frame reception, and frame transmission associated with transmission along the Ethernet network, such as following Institute of Electrical and Electronics Engineers (IEEE) 802.3 standards which define a hardware layer and a transport layer of Ethernet. The MAC module 64 for the "X" lane is coupled to the SDN A network, and the MAC module 66 for the "Y" lane is coupled to the SDN B network.

Figure 3:
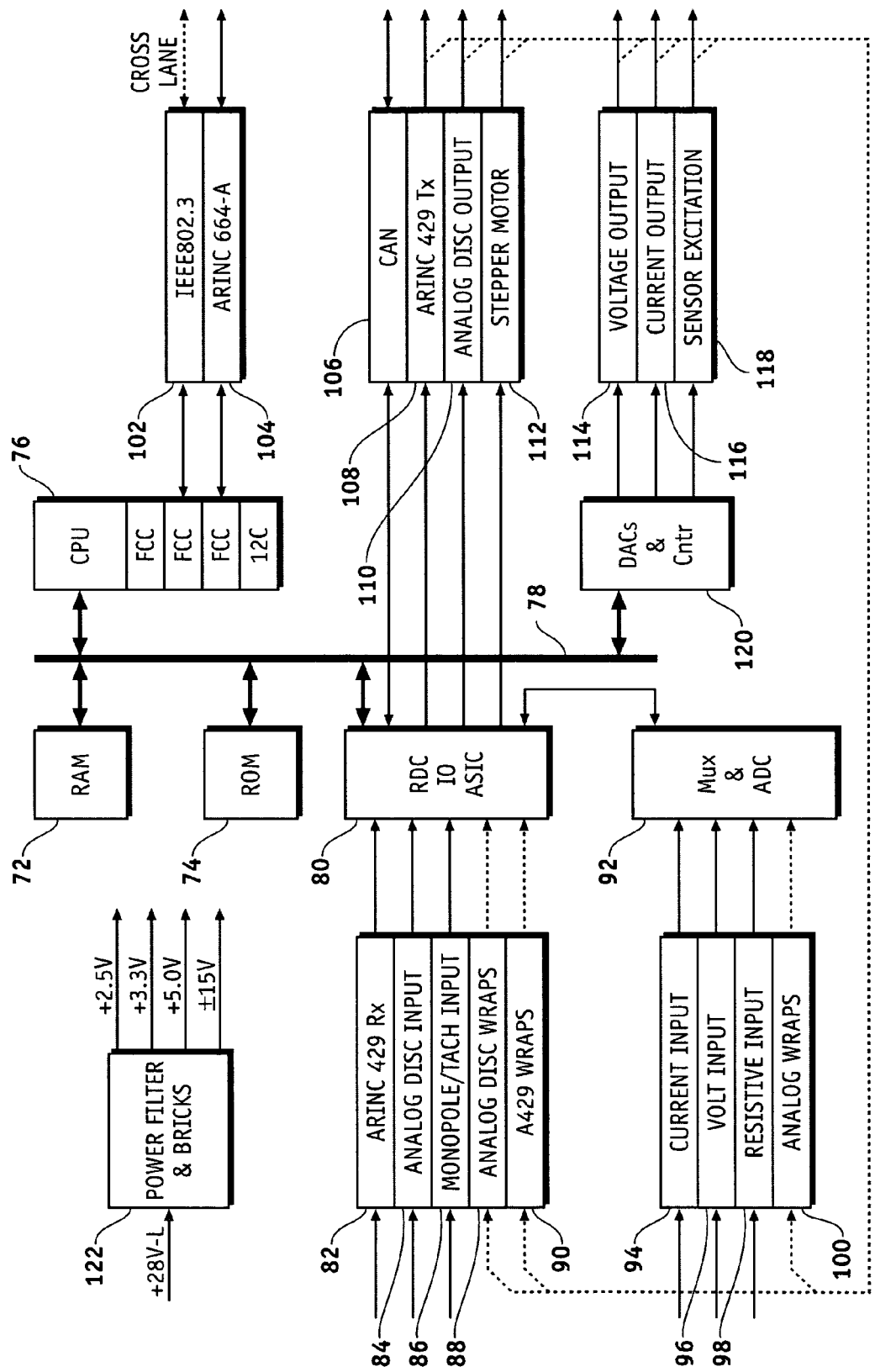
FIG. 3 is a schematic diagram illustrating an exemplary embodiment of a single RDC lane.

FIG. 3 is a schematic diagram illustrating an exemplary embodiment of a single RDC lane 70. In this exemplary embodiment, the RDC, such as the RDC 16 shown in FIG. 1, includes a microprocessor core having a variety of devices including, but not limited to, a random access memory (RAM) 72, a read-only memory (ROM) 74, and a central processing unit (CPU) 76 coupled to a data bus 78. On an input side of the RDC, an RDC input/output (IO) module 80 is additionally coupled to the bus 78. The RDC IO module 80 may receive various avionic network inputs such as from the input unit 50 shown in FIG. 2. The inputs include, but are not limited to, an ARINC 429 Rx input 82, an analog/discrete input 84, a monopole/tach input 86, analog/discrete wraps 88, and A429 wraps 90. A429, or ARINC 429, refers to a standard or protocol related to serial bus connection. The term "wrap" is referred to herein as a feedback loop that may be used for self-governance or self-monitoring. A multiplexer (Mux) and analog-to-digital converter (ADC) 92 may also coupled with the RDC IO module 80 and receives inputs such as a current input 94, a voltage input 96, a resistive input 98, and analog wraps 100.

On an output side of the RDC, an IEEE 802.3 signal conditioning module 102 and an ARINC 664 signal conditioning module 104 may be coupled to the CPU 76. ARINC 664 refers to a standard or protocol related to Ethernet connection. The CPU 76 is coupled to a cross lane bus, such as the cross lane bus 68 shown in FIG. 2, via the IEEE 802.3 conditioning module 102. The RDC IO module 80 may be coupled to a variety of signal conditioning outputs such as from the output unit 54 shown in FIG. 2. The outputs include, but are not limited to, a controller area network (CAN) output 106, an ARINC 429 Tx output 108, an analog disc output 110, and a stepper motor output 112. A voltage output 114, a current output 116, and a sensor excitation output 118 may also be coupled to the data bus 78 via a digital-to-analog converter (DAC) and controller 120.

The RDC operates with a 28 VDC power input to a power filter 122 associated with each lane 70, although various other types of conventional power sources may be used with the RDC lane 70. The RDC may also be implemented using an application specific integrated circuit (ASIC) to reduce overall part count. Additionally, although the RDC lane 70 is described hereinabove with respect to particular inputs and outputs, a variety of other inputs/outputs associated with a conventional avionic environment may be used with the RDC lane as appreciated by those of skill in the art.

The dual lane. RDC 16 (FIG. 1) may be based on a dual-board low cost structure to fit in a conventional baseline RDC chassis. The dual lane RDC system 12 (FIG. 1) provides greater flexibility to address availability issues generally without requiring additional aircraft wiring or sensors, and provides a failure rate that is typically equivalent to a typical federated system. If a single RDC is used to support multiple systems, it is preferable that a loss of an RDC and associated functionality does not result in a hazardous situation. In the dual RDC system, the probability of a single failure, such as an RDC's processor, resulting in a simultaneous loss of multiple systems (e.g., fuel, hydraulics, and equipment cooling) is substantially reduced.

With a dual lane RDC, a failure of an individual input circuit, in most cases, is transparent to a flight crew. For example, if a 4-20-mA input circuit for a hydraulic pressure in an RDC failed, other redundant circuitry is available since the circuit is dual-staked. This fault is logged as a maintenance failure and typically not presented to the flight crew. In a single lane RDC, the result appears on the cockpit display as a loss of hydraulics data. Due to circuit redundancy, dispatch with failures is possible using the dual lane RDC.

A dual system implemented using conventional techniques typically has two dual AFDX end systems that are associated with two sets of ports on the network switches. Implementing an RDC end system such as the RDC end system 12 shown in FIG. 1, one dual AFDX end system is generally required that is associated with one set of ports on the network switches.

Additionally, each Virtual Link associated with each conventional end system generally requires an allocation of bandwidth on the Ethernet network that typically results in double the bandwidth associated with a single lane connection in the conventional end system. By using an RDC end system such as the RDC end system 12 shown in FIG. 1, independent Virtual Links are generally not required for each RDC lane and the bandwidth on the network of a single lane unit is typically sufficient. For example, a dual system implemented using conventional techniques typically has two sets of Virtual Links associated with the two AFDX drops, whereas using the RDC end system 12 generally requires one AFDX drop that is associated with one set of Virtual Links and results in an overall reduction of network bandwidth demand.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A remote data concentrator (RDC) for an avionics Ethernet network, said RDC comprising:
    a line replaceable unit (LRU) input;
    a first processing lane directly coupled to said LRU input, said first processing lane having a first output;
    a second processing lane directly coupled to said LRU input, said second processing lane having a second output; and
    a processor coupled to said first processing lane and said second processing lane and configured to route data from at least one of said first output and said second output to the Ethernet network, said processor comprising a link coupling said first processing lane with said second processing lane, said link configured to transfer data between said first processing lane and said second processing lane, wherein the first processing lane and the second processing lane process universal data protocol (UDP) messages in parallel, and wherein each processing lane synchronizes a virtual link sequence number for each UDP message transmitted between the first processing lane or the second processing lane and the Ethernet network.

2. An RDC according to claim 1, wherein said link is a bus; and
    wherein each of said first output and said second output are configured to pass UDP messages, said UDP messages of said first output containing substantially similar information as said UDP messages of said second output.

3. An RDC according to claim 1, wherein said link is configured to operate on an Ethernet protocol.

4. An RDC according to claim 3, wherein said link is configured to operate on an Institute of Electrical and Electronics Engineers (IEEE) 802.3 protocol.

5. A dual redundant avionics network comprising:
a first system data network (SDN) having a first SDN port;
a second SDN having a second SDN port; and
a remote data concentrator (RDC) end system configured to communicate with said first SDN and said second SDN, said RDC end system comprising:
a first processing lane coupled to said first SDN port, said first processing lane having a first line replaceable unit (LRU) input;
a second processing lane coupled to said second SDN port, said second processing lane having a second LRU input; and
a processor coupled to said first processing lane and said second processing lane, said processor comprising a link coupling said first processing lane with said second processing lane, said link configured to transfer data between said first processing lane and said second processing lane, wherein the first processing lane and the second processing lane process universal data protocol (UDP) messages in parallel, and wherein each processing lane synchronizes a virtual link sequence number for each UDP message transmitted between the processing lane and either the first or the second SDN.

6. A dual redundant avionics network according to claim 5 further comprising an LRU coupled to said RDC, said LRU configured to transmit a data signal, said LRU comprising a first output coupled to said first processing lane and said second processing lane.

7. A dual redundant avionics network according to claim 5 further comprising an LRU coupled to said RDC, said LRU comprising a first output coupled to said first processing lane and a second output coupled to said second processing lane.

8. A dual redundant avionics network according to claim 6, wherein said first processing lane and said second processing lane are configured to process said data signal; and
wherein said processor is configured to synchronously operate said first processing lane and said second processing lane and process said data signal in parallel.

9. A dual redundant avionics network according to claim 8, wherein said first processing lane is configured to transmit a first data signal to said first SDN port and said second processing lane is configured to transmit a second data signal to said second SDN port, said first data signal substantially similar to said second data signal.

10. A dual redundant avionics network according to claim 5, wherein said link is configured to operate on an Ethernet protocol.

11. A dual redundant avionics network according to claim 5, wherein said link is configured to operate on an IEEE 802.3 protocol.

12. A dual redundant avionics network according to claim 5, wherein said first SDN, said second SDN, and said RDC end system are each configured to communicate on an Ethernet network.

13. A remote data concentrator (RDC) end system in an Ethernet network, the RDC end system comprising:
a first port configured to couple to a first network in the Ethernet network;
a second port configured to couple to a second network in the Ethernet network;
a first processing lane coupled to said first port, said first processing lane comprising:
a first input configured to receive input signals;
a first output configured to transmit output signals; and
a first processing unit coupled to said first input and said first output, said first processing unit configured to control data flow to said first output, to said first port, and from said first input;
a second processing lane coupled to said second port, said second processing lane comprising:
a second input configured to receive input signals;
a second output configured to transmit output signals; and
a second processing unit coupling said second input with said second output, said second processing unit configured to control data flow to said second output, to said second port, and from said second input; and
a cross-lane bus coupled to said first processing unit and said second processing unit, said cross-lane bus configured to transfer data between said first processing lane and said second processing lane, wherein the data transferred on the cross-lane bus comprises one or more parameters, and wherein responsive to a failure of the first processing lane, the second processing lane transmits the input signals from the second input and sets parameters only available from the first processing lane as invalid.

14. An RDC end system according to claim 13, wherein said cross-lane bus is further configured to:
transfer first processing lane data different from second processing lane data to said second processing lane; and
transfer second processing lane data different from first processing lane data to said first processing lane.

15. An RDC end system according to claim 13 further comprising:
a first media access control (MAC) module coupled to said first processing unit, said first MAC module configured to format data of said first processing lane for routing to the Ethernet network; and
a second MAC module coupled to said second processing unit, said second MAC module configured to format data of said second processing lane for routing to the Ethernet network.

16. An RDC end system according to claim 13, wherein said cross-lane bus is configured to operate on an Ethernet protocol.

17. An RDC end system according to claim 16, wherein said cross-lane bus is configured to operate on an IEEE 802.3 protocol.

18. An RDC end system according to claim 13 further comprising:
a first feedback connected to said first input and said first output; and
a second feedback connected to said second input and said second output.

19. An RDC end system according to claim 13, wherein the input signals received by said first input and the input signals received by said second input both originate from a same source.

* * * * *